United States Patent [19]

Richards

[11] Patent Number: 5,103,571
[45] Date of Patent: Apr. 14, 1992

[54] DIAMETER GAGE FOR RINGS AND ROUND OBJECTS

[76] Inventor: John E. Richards, Rte. 9, Box 1408, Livingston, Tex. 77351

[21] Appl. No.: 638,612

[22] Filed: Jan. 8, 1991

[51] Int. Cl.⁵ .............................................. G01B 3/10
[52] U.S. Cl. ................................................. 33/555.4
[58] Field of Search .................. 33/555.1, 555.4, 561.1

[56] References Cited

U.S. PATENT DOCUMENTS

| | | | |
|---|---|---|---|
| 1,540,378 | 6/1925 | Wasson | 33/555.4 |
| 1,978,682 | 10/1934 | Marvin | 33/555.4 |
| 3,183,601 | 5/1965 | Niles | 33/555.4 |

Primary Examiner—Harry N. Haroian
Attorney, Agent, or Firm—Neal J. Mosely

[57] ABSTRACT

A gage apparatus for determining uniformity in the inside or outside diameter of flexible rings and generally round objects based on the ratio of the circumference of a circle to its diameter. A spring biased lever pivotally mounted on a support plate has a releasable clamp at one end. An indicator is engaged with the lever to indicate the amount of pivotal movement thereof. A thin flexible band of stiff material has one end secured to a spool on the support plate and a portion of its length passes slidably through the clamp and forms a circular loop and its terminal end is fixed to the clamp. The ratio of the distance from the pivot point of the lever to the connection with the band is pi (3.1416) times the distance from the pivot point to the connection with the indicator whereby circumferential measurements are converted and indicated as diametric measurements. As the lever pivots, the diameter of the circular looped portion of the band will increase or decrease.

17 Claims, 2 Drawing Sheets

DIAMETER GAGE FOR RINGS AND ROUND OBJECTS

BACKGROUND OF THE INVENTION

1. Field of the Invention

This invention relates generally to inside and outside diameter gages, and more particularly to diameter gages which provide an accurate reading of the + or − tolerance of the inside or outside diameter of flexible rings and/or generally round objects by applying controlled pressure to and measuring the interior or exterior circumference of the object and converting the measurement of the circumference to a diameter through a lever and indicator mechanism constructed on a ratio of 3.1416 to 1 (the ratio of the circumference to the diameter).

2. Brief Description of the Prior Art

In the past, there has been no reliable apparatus or method for accurately measuring the outside diameter of flexible rings and/or oval or out-of-round objects. These objects, such as O-rings and seals are usually molded of rubber, teflon, and similar materials. The control of the quality of the finished product is usually accomplished by certifying the mold prior to accepting molded O-rings, seals, and the like.

The standard practice for measuring the inside diameter of flexible rings, seals, etc., is by the use of a conical tapered gage which has a series of vertically spaced circles scribed on its circumference corresponding to various diameters. A ring or seal to be measured is placed on the conical tapered gage and allowed to rest where its inside diameter engages the exterior of the conical surface and a reading to determine the diameter on the gage at which the ring is at rest.

There are several patents which disclose various gages and ring testing apparatus.

Thornton U.S. Pat. No. 2,290,605 discloses a testing machine for testing split lock-washers which utilizes a split core to exert a uniform gradually increasing pressure to the inside periphery of the washer until it ruptures to determine the structural strength of the washer.

Bartlett U.S. Pat. No. 3,111,840 discloses a hydraulic tensile tester for ring structures which utilizes hydraulic pressure to exert a uniform gradually increasing pressure to the inside periphery of a ring until it ruptures to determine the modulus of elasticity and ultimate tensile strength of the ring.

Dega et al U.S. Pat. No. 3,628,376 discloses a test instrument for determining uniformity in molded elastomeric rings wherein the ring is flexed between two power driven rollers while being loaded at a predetermined deflection by a third roller connected to a load sensor coupled to an instrument which records the stress level about the circumference of the ring.

Rober U.S. Pat. No. 4,122,705 discloses a ring inspection device wherein a pair of crossed mandrels are moved into the center of the ring and spread apart to stretch the ring in a twisted path. The mandrels are rotated so that the angular orientation of the cross section changes as the ring passes an optical measurement apparatus which senses the cross section diameter of the ring at several locations while a load cell senses the elasticity of the ring.

The present invention is distinguished over the prior art in general, and these patents in particular by a gage apparatus for determining uniformity in the inside or outside diameter of flexible rings and generally round objects based on the ratio of the circumference of a circle to its diameter. A spring biased lever pivotally mounted on a support plate has a releasable clamp at one end. An indicator is engaged with the lever to indicate the amount of pivotal movement thereof. A thin flexible band of stiff material has one end secured to a spool on the support plate and a portion of its length passes slidably through the clamp and forms a circular loop and its terminal end is fixed to the clamp. The ratio of the distance from the pivot point of the lever to the connection with the band is pi (3.1416) times the distance from the pivot point to the connection with the indicator whereby circumferential measurements are converted and indicated as diametric measurements. As the lever pivots, the diameter of the circular looped portion of the band will increase or decrease.

The looped portion of the band is set to engage the circumference of a master ring of known diameter and then the clamp is tightened to secure the band to the lever and the indicator is set to zero. The master ring is then removed and the band is engaged on the circumference of an object to be measured. The lever will pivot corresponding to the changes in the circumference between the master ring and the object being measured, such that the difference between the known diameter and the diameter + of the object being measured will be indicated.

SUMMARY OF THE INVENTION

It is therefore an object of the present invention to provide an inside and outside diameter gage which will provide an accurate reading of uniformity of the inside or outside diameter of flexible rings and/or generally round objects.

It is another object of this invention to provide an inside and outside diameter gage which will provide an accurate reading of the + or − tolerance of the inside or outside diameter of flexible rings and/or generally round objects.

Another object of this invention is to provide an inside and outside diameter gage which will provide an accurate reading of uniformity of the inside or outside diameter of flexible rings and/or generally round objects by applying controlled pressure to and measuring the interior or exterior circumference of the object.

Another object of this invention is to provide an inside and outside diameter gage which will provide an accurate reading of uniformity of the inside or outside diameter of flexible rings and/or generally round objects by applying controlled pressure to and measuring the interior or exterior circumference of the object and converting the measurement of circumference to a diameter.

Another object of this invention is to provide an inside and outside diameter gage which will provide an accurate reading of uniformity of the inside or outside diameter of flexible rings and/or generally round objects by applying controlled pressure to and measuring the interior or exterior circumference of the object through a lever and indicator mechanism constructed on a ratio of 3.1416 to 1 (the ratio of the circumference to the diameter).

A further object of this invention is to provide an inside and outside diameter gage which will provide an accurate reading of uniformity of the inside or outside diameter of flexible rings and/or generally round objects which is portable and simple to operate.

A still further object of this invention is to provide an inside and outside diameter gage which will provide an accurate reading of uniformity of the inside or outside diameter of flexible rings and/or generally round objects which is simple in construction, economical to manufacture, and reliable in use.

Other objects of the invention will become apparent from time to time throughout the specification and claims as hereinafter related.

The above noted objects and other objects of the invention are accomplished by a gage apparatus for determining uniformity in the inside or outside diameter of flexible rings and generally round objects based on the ratio of the circumference of a circle to its diameter. A spring biased lever pivotally mounted on a support plate has a releasable clamp at one end. An indicator is engaged with the lever to indicate the amount of pivotal movement thereof. A thin flexible band of stiff material has one end secured to a spool on the support plate and a portion of its length passes slidably through the clamp and forms a circular loop and its terminal end is fixed to the clamp. The ratio of the distance from the pivot point of the lever to the connection with the band is pi (3.1416) times the distance from the pivot point to the connection with the indicator whereby circumferential measurements are converted and indicated as diametric measurements. As the lever pivots, the diameter of the circular looped portion of the band will increase or decrease.

The looped portion of the band is set to engage the circumference of a master ring of known diameter and then the clamp is tightened to secure the band to the lever and the indicator is set to zero. The master ring is then removed and the band is engaged on the circumference of an object to be measured. The lever will pivot corresponding to the changes in the circumference between the master ring and the object being measured, such that the difference between the known diameter and the diameter of the object being measured will be indicated.

Description of the Preferred Embodiment

Outside Diameter Gage

Figure 1:
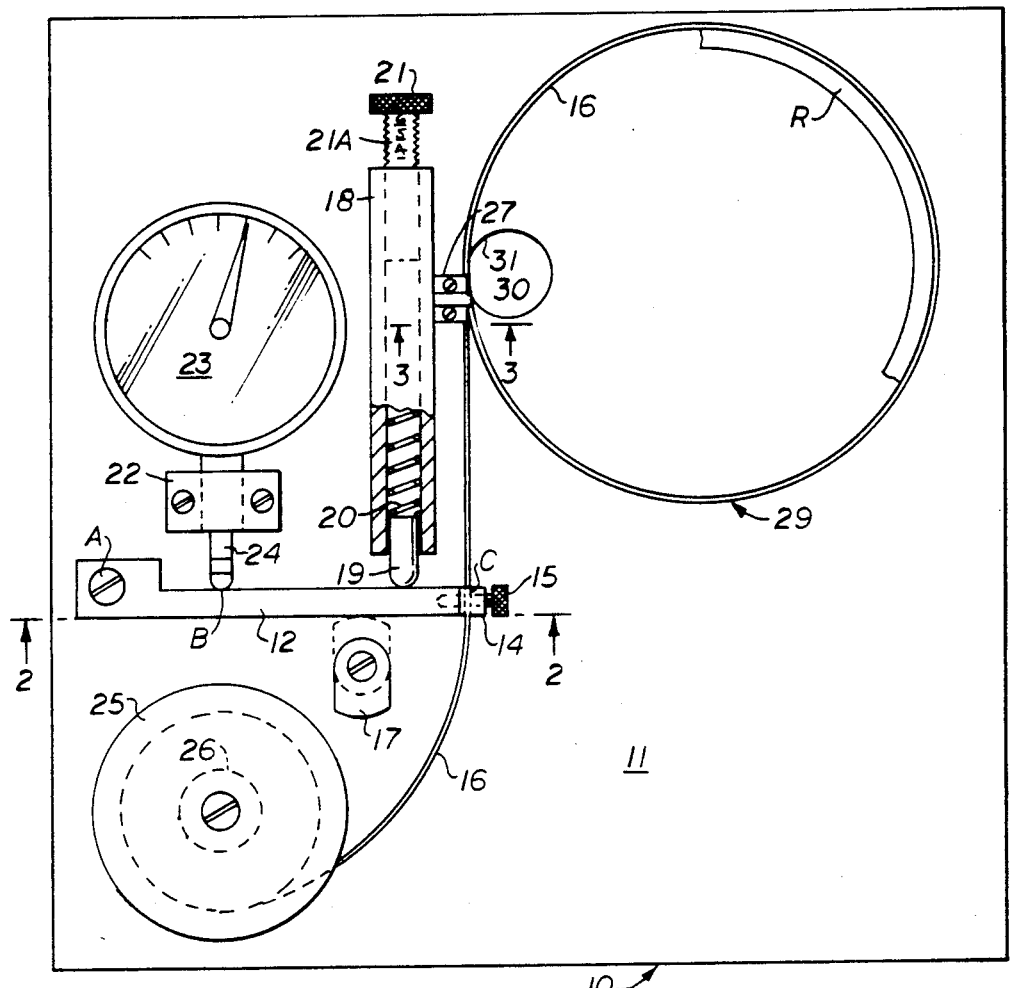
FIG. 1 is a top plan view of a gage for measuring the outside diameter of rings and round objects in accordance with the present invention.
Figure 2:
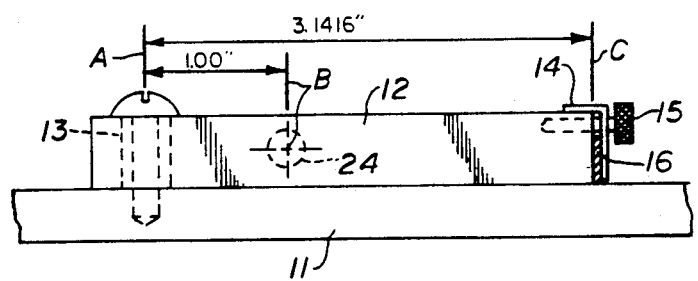
FIG. 2 is a cross section view of the lever arm of the gage taken along line 2—2 of FIG. 1.
Figure 3:
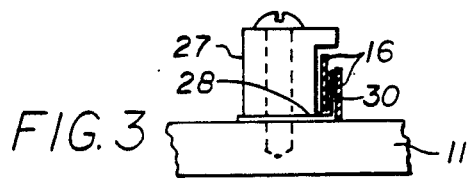
FIG. 3 is cross section view of the clamping block mechanism of the gage taken along line 3—3 of FIG. 1.

FIGS. 1, 2, and 3 show a gage for outside diameters and FIGS. 4-7 show a gage for inside diameters. The outside diameter gage and its operation will be described first followed by a description of the inside diameter gage.

Referring now to FIGS. 1, 2, and 3, there is shown in FIG. 1, a preferred outside diameter gage which gives an accurate reading of the + or − tolerance of the outside diameter of flexible rings and/or oval or out-of-round objects. It does this by measuring the circumference of the object by applying accurately controlled pressure to the outer circumference of the object and then converting the measurement of the circumference to a diameter through a lever and indicator mechanism which is constructed on a ratio of 3.1416 to 1 (the ratio of the circumference of a circle to its diameter).

The outside diameter gage apparatus 10 comprises a flat base or support plate 11 onto which the components are mounted. A generally rectangular lever 12 is pivotally mounted at one end on the support plate 11. As seen in FIG. 2, a bearing 13 may be used at the connection to provide a precision pivot point A. An inverted L-shaped clamp member 14 is secured at the outer end of the lever 12 by a locking screw 15 to releasably clamp a tape or band 16 therebetween (described hereinafter). The clamping surface (point C) of the clamp is 3.1416" from the pivot point A of the lever 12. An eccentric block 17 is pivotally mounted beneath the lever 12 near its outer end, and is turned upward (dotted line) to hold the lever 12 in a mid position for setting the gage to a master ring and then rotated 180 degrees downward to serve as a down stop when the gage is used.

A rectangular sleeve 18 is mounted on the support plate 11 above the lever 12 near its outer end. A plunger rod 19 having a rounded end is slidably received in the sleeve 18 and is urged downwardly by a compression spring 20 contained in the sleeve to engage the top of the lever and resiliently urge it pivotally downward. A thumb screw 21 is threadedly received in the top end of the sleeve and engaged on the compression spring 20. The screw 21 may have calibrations 21A (lines and numbers) to indicate the pressure being applied to lever 12 by the spring 20.

An indicator mounting block 22 is mounted on the support plate 11 above the lever 12 and receives a mechanical or electronic indicator 23 which has a downwardly extending point or rod 24. The indicator rod or point 24 rides on the lever at a distance of 1.00" from the pivot point A of the lever and defines point B of the system. The distance the indicator point 24 (point B) travels up or down is read on the indicator scale in tenths, hundredths, or thousandths. Thus, the lever 12 is designed such that its length from pivot point A to point C is 3.1416 times the length from point A to point B (the ratio of the circumference of a circle to its diameter).

A spool 25 is mounted on the support plate 11 below the lever 12. One end of a thin flexible tape or band 16 of stiff material, such as spring steel, which will not stretch under light loads is secured at one end and wound on the spool 25. The spool may be mounted using a spring washer 26 to provide a light drag on the spool so that it will not turn freely and unwind the tape or band 16. A rectangular guide block 27 is secured on the plate 11 adjacent the rectangular sleeve 18 and above the lever clamp 14. As seen in FIG. 3, an L-shaped bracket 28 has its horizontal leg mounted between the guide block 27 and the plate 11 and its vertical leg defines a small gap between the vertical leg and the block 27. The gap is axially aligned above the clamping surface C of the lever 12.

One end of the tape or band 16 is secured and wound on the spool 25 and the tape extends in a path outwardly from the reel, curves upwardly and passes through the clamp 14 at the end of the lever 12, and slidably through the gap between the guide block 27 and the bracket 28. The tape or band 16 is straight between the clamp 14 and the guide block 27 and then loops around to form a circular loop 29 and the terminal end of the tape or band is fixed to the exterior of the vertical leg of the bracket 28 at 30. A hole 31 is provided through the support plate 11 to receive the finger of the user to facilitate lifting the rings from the plate.

Thus, as the lever 12 pivots, the tape or band 16 secured at its outer end will slide freely up or down through the clamping block 27 which will cause the diameter of the circular looped portion 29 of the band to increase or decrease. A portion of a ring R to be measured is shown in FIG. 1.

Outside Diameter Gage Operation

To use the outside diameter gage 10, the circular looped portion 29 of the tape or band 16 is set to the prescribed diameter of the ring to be measured by using a precision master ring having a true known diameter. With the clamping screw 15 loosened, the lever 12 is raised, and block 17 beneath the lever is rotated to the up position to take the tension off the looped portion 29 of the tape or band. The spool 25 is turned counterclockwise to expand the tape circle to a diameter larger than the outside diameter of the master ring.

The master ring is placed inside the circular portion 29 of the band, and the spool 25 is turned clockwise to snug the tape on the circumference of the master ring. The screw knob 15 is then tightened to clamp the straight portion of the band 16 onto the end of the lever. The spool 25 is turned approximately ⅓ turn counterclockwise, and the block 17 is turned to the down position allowing pivotal movement of the lever.

The indicator 23 is "zeroed in" (set to 0) by turning the dial indicator face to place the zero under the hand of the dial, and then the indicator face is secured.

The master ring is then removed by lifting the lever 12 to enlarge the circular portion 29 of the band and lifting the master ring from the support plate 11. The lever 12 is pushed up to enlarge the circular portion 29 of the band, a ring R to be measured is placed into the circular looped portion 29 of the band, and the lever 12 is slowly released.

The force of the spring 20 on the plunger rod 19 pushes the lever downward to tighten the circular looped portion 29 of the band against the outer circumference of the ring R. The band 16 is gripped on the end of the lever 12 at a distance of 3.1416" (C) from the pivot point (A) of the lever and the indicator point 24 rides on the lever at a distance of 1.00" (B) from the pivot point A. The distance the indicator point (B) travels up or down is read on the indicator scale in tenths, hundredths, or thousandths. The indicator reading will indicate that the diameter of the ring being measured is a certain number of thousandths of an inch above or below the known diameter of the master ring.

If the diameter of the object being measured changes 0.001", then its circumference will change 0.00314. This causes the tape to move the end of the lever 12 a distance of 0.00314, thus moving point B on the lever 0.001", this causes the indicator to show a change in reading of 0.001", the same amount as the diameter change of the measured object.

Inside Diameter Gage

The inside diameter gage gives an accurate reading of the + or − tolerance of the inside diameter of flexible rings and/or oval or out-of-round objects. It does this by measuring the inside circumference of the object by applying accurately controlled pressure to the circumference of the object and then converting the measurement of the circumference to a diameter through a lever and indicator mechanism which is constructed on a ratio of 3.1416 to (the ratio of the circumference of a circle to its diameter).

Figure 5:
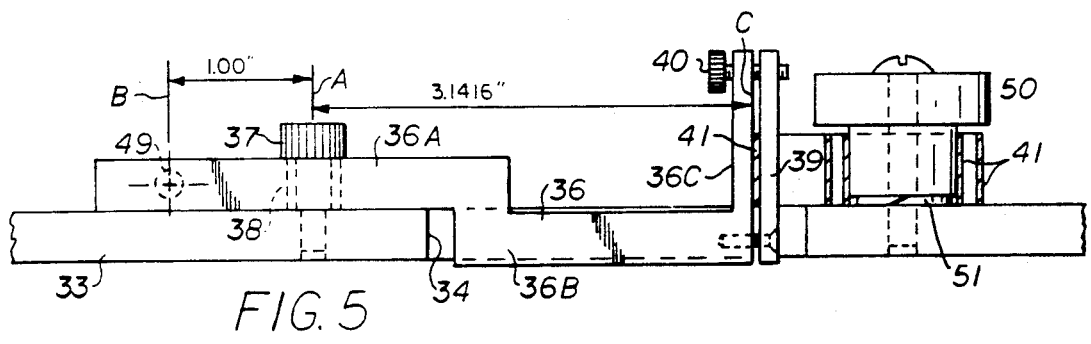
FIG. 5 is a cross section view of the lever arm of the gage taken along line 5—5 of FIG. 4.

The inside diameter gage apparatus 32 comprises a flat support plate 33 onto which the components are mounted. The support plate 33 has a wedge-shaped opening 34, and a circular opening 35 through its surface. A generally rectangular lever 36 is pivotally mounted on the support plate 33. As seen in FIG. 5, the lever 36 has a first portion 36A at one end which is above the top surface of the plate 33, a second portion 36B lower than the first portion which is disposed in the wedge-shaped opening 34, and an upstanding portion 36C at the end of the second portion 36B which extends above the surface of the plate 33.

The lever 36 is pivotally mounted on the plate 33 by a threaded fastener 37 extending through the first portion 36A of the lever, and a bearing 38 may also be used at the pivotal connection of the lever 36 to the plate 33 to provide a precision pivot point A.

The upstanding portion 36C of the lever 36 has a rectangular clamp member 39 secured at its lower end to the upstanding portion 36C and a locking screw 40 connects the upper ends of the upstanding portion 36C and the clamp member 39 together to releasably clamp a tape or band 41 therebetween. The clamping surface (point C) of the clamp is 3.1416" from the pivot point A of the lever 36. An eccentric block 42 is pivotally mounted beneath the lever 36, and is turned upward (dotted line) to hold the lever 36 in an intermediate position for setting the gage to a master ring and then rotated 180 degrees downward to serve as a down stop when the gage is used.

A rectangular sleeve 43 is mounted on the support plate 33 above the lever 36. A plunger rod 44 having a rounded end is slidably received in the sleeve 43 and is urged downwardly by a compression spring 45 contained in the sleeve to engage the top of the lever and resiliently urge it pivotally downward. A thumb screw 46 is threadedly received in the top end of the sleeve 43 and engaged on the compression spring 45. The screw 46 may have calibrations 46A (lines and numbers) to indicate the pressure being applied to lever 36 by the spring 45.

An indicator mounting block 47 is mounted on the support plate 33 beneath the first portion 36A of the lever 36 and receives a mechanical or electronic indicator 48 which has a upwardly extending point or rod 49. The indicator rod or point 49 rides on the lever 36 at a distance of 1.00" from the pivot point A of the lever and defines point B of the system. The distance the indicator point 49 (point B) travels up or down is read on the indicator scale in tenths, hundredths, or thousandths. Thus, the lever 36 is designed such that its length from pivot point A to point C is 3.1416 times the length from point A to point B (the ratio of the circumference of a circle to its diameter).

A spool or reel 50 is mounted on the support plate 33 laterally beyond the upstanding portion 36C of the lever 36. One end of a thin flexible tape or band 41 of stiff material, such as spring steel, which will not stretch under light loads is secured at one end and wound on the spool 50. The spool 50 may be mounted using a spring washer 51 to provide a light drag on the spool so that it will not turn freely and unwind the tape or band.

Figure 6:
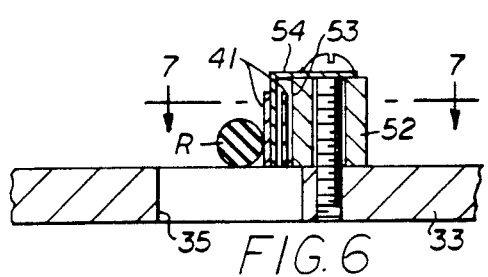
FIG. 6 is a cross section view of the bracket for holding the tape of the gage taken along line 6—6 of FIG. 4.
Figure 7:
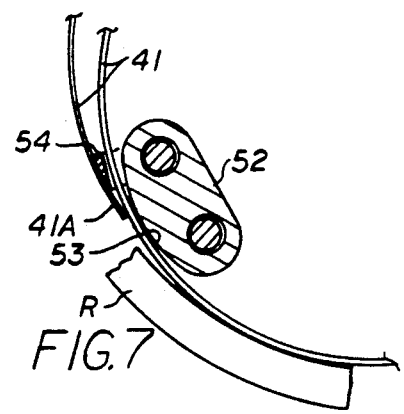
FIG. 7 is an enlarged top cross section of the tape guide block and tape mounting bracket of the gage of FIG. 4.

As seen in FIGS. 6 and 7, a guide block 52 having a curved outer surface 53 is secured on the plate 33 radially spaced from the spool 50. An inverted generally L-shaped clamping bracket 54 is mounted on the guide block 52 to define a small gap between the depending leg of the bracket 54 and the curved surface 53.

One end of the tape or band 41 is wound on the spool 50 and the other end of the band extends in a curved path outwardly from the reel and through the clamp member 39, is slidably received through the gap between the curved surface 53 of the guide block 52 and the depending leg of the bracket 54 and loops around to encircle the upstanding portion 36C of the lever 36 and the spool 50. The free end 41A of the tape or band 41 is fixed to the outer side of the depending leg of the bracket 54. Thus, the tape or band 41 forms a circular loop 55 around the spool 50, the upstanding portion 36C of the lever 36 and the guide block 52. The curved surface 53 of the guide block 52 aids in maintaining the looped band configuration.

Figure 4:
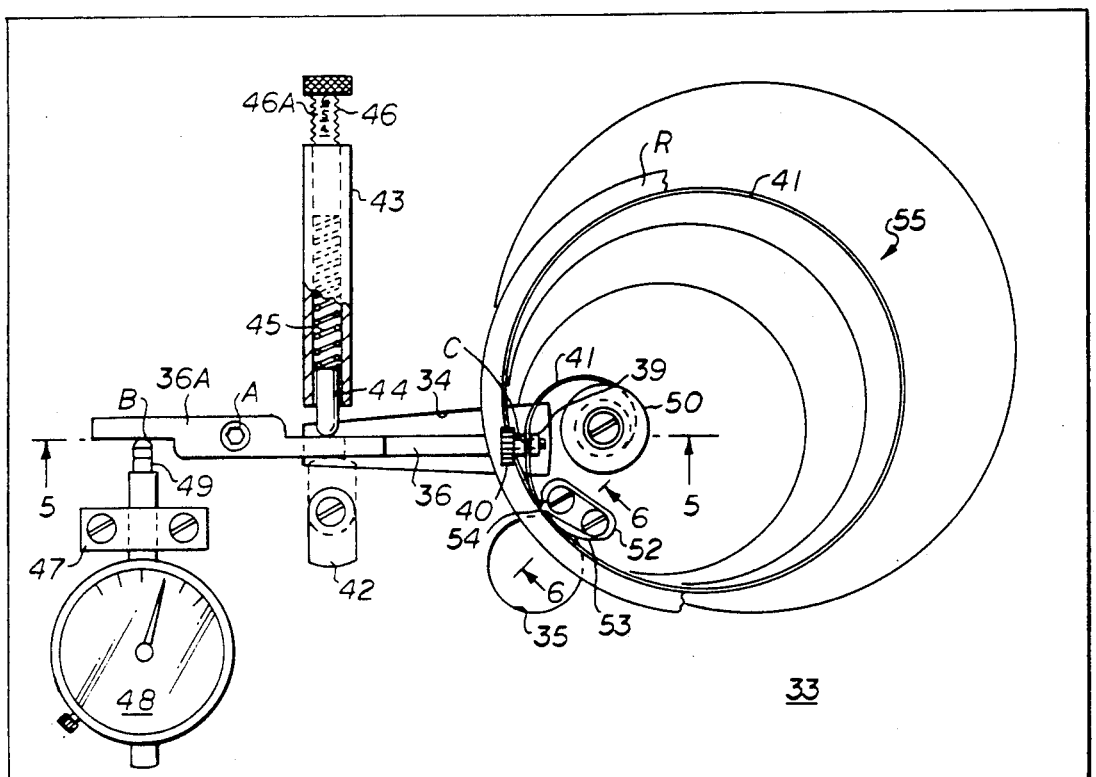
FIG. 4 is a top plan view of a gage for measuring the inside diameter of rings in accordance with the present invention.

As explained hereinafter, the tape or band 41 is clamped at one end of the lever 36 and as the lever pivots, the tape or band 41 will slide freely up or down through the gap between the bracket 54 and the guide block 52 which will cause the diameter of the circular looped portion 55 of the band to increase or decrease. A portion of a ring R to be measured is shown in FIGS. 4, 6, and 7.

Inside Diameter Gage Operation

To use the inside diameter gage 32, the circular looped portion 55 of the tape or band 41 is set to the prescribed diameter of the ring to be measured by using a precision master ring having a known true inside diameter. The operator raises the lever 36 and rotates the block 42 beneath the lever to the raised position to take the tension off the looped portion 55 of the band.

The spool 50 is turned clockwise to reduce the circular portion 55 of the band smaller than the inside diameter of the master ring. The master ring is placed over the circular portion 55 of the band. The spool 50 is turned counter-clockwise to release enough of the band 41 and the band is pushed through the clamping member 39 at the end of the lever 36 so that it engages the inside circumference of the master ring. The screw knob 40 at the end of the lever 36 (clamping member 39) is tightened to grip the band. The band should not be tight on the spool, and the lever 36 must be free to pivot through its full range.

The block 42 is turned to the down position to allow movement of the lever 36 and the lever is pressed down and released two or three times to seat the band on the inside circumference of the master ring. The indicator 48 is "zeroed in" (set to 0) by turning the dial indicator face to place the zero under the hand of the dial, and then the indicator face is secured.

The master ring is then removed by lifting the lever 36 to reduce the diameter of the circular portion 55 of the band and lifting the master ring from the support plate 33. The circular hole 35 in the support plate 33 receives the finger of the user to facilitate gripping the ring for installation and removal.

The lever 36 is pushed u again to reduce the diameter of the circular portion 55 of the band and a ring R to be measured is placed over the circular looped portion 55 of the band and the lever 36 is released. The lever 36 is pressed down and released slowly two or three times to seat the band on the inside circumference of the ring R.

The force of the spring 45 against plunger rod 44 pushes the lever 36 downward to expand the circular looped portion 55 of the band against the interior circumference of the ring R. The band 41 is gripped on the end of the lever 36 at a distance of 3.1416" (point C) from the pivot point A of the lever and the indicator point 49 rides on the lever at a distance of 1.00" (point B) from the pivot point A. The distance the indicator point (B) travels up or down is read on the indicator scale in tenths, hundredths, or thousandths. The indicator reading will indicate that the diameter of the ring being measured is a certain number of thousandths of an inch above or below the known diameter of the master ring.

If the diameter of the object being measured changes 0.001", then its circumference will change 0.00314. This causes the tape to move the end of the lever 12 a distance of 0.00314, thus moving point B on the lever 0.001", this causes the indicator to show a change in reading of 0.001", the same amount as the diameter change of the measured object.

With either gage, by consistently applying a predetermined circumferential force coupled with a precision lever mechanism and an indicator in the 10 to 1 ratio of the product tolerance, an accurate measurement can be made. This enables an engineer to specify that a given ring or seal must fall within a certain range. He can also specify the measuring force to be used. Thus, the product quality is improved, equipment failure due to out-of-tolerance rings and seals is reduced, as well as reducing the time required for inspection of rings and seals.

While this invention has been described fully and completely with special emphasis on a preferred embodiment, it should be understood that within the scope of the appended claims the invention may be practiced otherwise than as specifically described herein.

I claim:

1. A gage apparatus for determining uniformity in the diameter of flexible rings and generally round objects based on the ratio of the circumference of a circle to its diameter comprising;

a support for receiving and supporting an annular ring or generally round object, diametrically expansible and retractable ring engagement means on sad support engagable with a circumference of the ring or generally round object, lever means pivotally mounted on said support and operatively connected with said ring engagement means to pivot upon expansion or retraction thereof, controlled pressure means operatively connected with said lever means for controlling the pressure exerted on a circumference of the object being measured by said ring engagement means, indicator means on said support operatively connected with said lever to indicate the amount of pivotal movement thereof, said ring engagement means and said indicator means being spaced relative to the pivot point of said lever such that the ratio of the distance from the pivot point to the lever connection with said ring engagement means is pi (3.1416) times the distance from the pivot point to the lever connection with said indicator means whereby circumferential measurements are converted and indicated as diametric measurements, and said indicator means may be set to zero with said ring engagement means engaged on the circumference of a master ring of a known precise diameter and when said ring engagement means is engaged on the circumference of the object to be measured, the difference between the known diameter and the diameter of the object being measured will be indicated.

2. A gage apparatus according to claim 1 wherein said indicator means is connected with said lever at a distance of 1.00" from the pivot point thereof and said lever is connected to said ring engagement means at a distance of 3.1416" from said pivot point.

3. A gage apparatus according to claim 1 wherein said lever means comprises a generally rectangular lever pivotally mounted on said support and having releasable clamp means at one end, said ring engagement means comprises a thin flexible band of stiff material having one end adjustably secured to said support and a portion of its length passing slidably through said clamp means and forming a circular loop fitting an outside diameter of said ring and its terminal end fixed to said clamp means such that as said lever pivots, the diameter of the circular looped portion of said band will increase or decrease.

4. A gage apparatus according to claim 1 wherein said lever means comprises a generally rectangular lever pivotally mounted on said support and having releasable clamp means at one end, said ring engagement means comprises a thin flexible band of stiff material having one end adjustably secured to said support and a portion of its length passing slidably through said clamp means and forming a circular loop fitting an inside diameter of said ring and its terminal end fixed to said clamp means such that as said lever pivots, the diameter of the circular looped portion of said band will increase or decrease.

5. A gage apparatus according to claim 1 wherein said lever means comprises a generally rectangular lever pivotally mounted on said support and having releasable clamp means at one end, said ring engagement means comprises a thin flexible band of stiff material having one end adjustably secured to said support and a portion of its length passing slidably through said clamp means and forming a circular loop and its terminal end fixed to said clamp means such that as said lever pivots, the diameter of the circular looped portion of said band will increase or decrease, whereby with said clamp means released, the looped portion of said band may be set to firmly engage the circumference of a master ring having a known precise diameter and then said clamp means tightened to secure said band to said lever and said indicator means set to zero, and thereafter, said mater ring may be removed and replaced with an object to be measured and said band firmly engaged with the circumference thereof by the force of said controlled pressure means bearing on said lever and said lever is allowed to pivot corresponding to the changes in the circumference between the master ring and the object being measured, such that changes in the circumference will pivot said lever and cause said indicator means to show a change in reading corresponding to the diameter change of the measured object.

6. A gage apparatus according to claim 5 wherein said releasable clamp means is located at one end of said lever at a distance of 3.1416" from the pivot point of said lever, and said indicator means is operatively connected to said lever at a distance of 1.00" from the pivot point of said lever.

7. A gage apparatus according to claim 6 wherein said releasable clamping means comprises a clamp member at the outer end of said lever having a clamping surface located 3.1416" from the pivot point of said lever.

8. A gage apparatus according to claim 5 wherein said band has one end secured and wound on a spool rotatably mounted on said support.

9. A gage apparatus according to claim 8 including drag means disposed between said support and said spool to provide a light drag on said spool such that it will not turn freely to prevent accidental unwinding of said band.

10. A gage apparatus according to claim including a guide member secured on said support adapted to slidably receive a portion of said band and guide said band into a circular configuration to engage the circumference of a ring or other object to be measured.

11. A gage apparatus according to claim 10 in which said band is secured and wound of said spool at one end and extends in a path outwardly from said spool, curves upwardly and is releasably gripped by said clamp at the end of said lever, and passes slidably through said guide member, and then loops around to form a circular loop, and the terminal end of said band is fixed to said guide member, such that as said lever pivots, said band gripped at the outer end of said lever will slide freely through said guide member and cause the diameter of the looped portion of said band to increase or decrease.

12. A gage apparatus according to claim 11 in which said band has a straight portion extending between said clamp member and said guide member.

13. A gage apparatus according to claim including an eccentric member pivotally mounted beneath said lever near its outer end and movable between an engaged position to maintain said lever in an intermediate position for setting the gage to a master ring and a disengaged position to serve as a down stop when said gage is used.

14. A gage apparatus according to claim 1 wherein said controlled pressure means comprises a sleeve member mounted on said support member and spaced laterally relative to the pivot point of said lever, resilient means within said sleeve, and a plunger member slidably mounted in said sleeve and urged partially outward therefrom by said resilient means to engage said lever and resiliently urge it to pivot about the lever pivot point.

15. A gage apparatus according to claim 14 including an adjustment screw threadedly received in said sleeve and engaged on said resilient means for adjusting the pressure of engagement of said plunger member with said lever.

16. A gage apparatus according to claim 1 including calibrations on said adjustment screw corresponding to the pressure being applied to said lever.

17. A gage apparatus according to claim 1 including an aperture through said support member to receive a finger of the user to facilitate lifting the measured ring or object from said support member.

* * * * *